United States Patent
Wang et al.

(10) Patent No.: US 6,362,453 B1
(45) Date of Patent: Mar. 26, 2002

(54) METHOD OF ETCHING TRANSPARENT SOLID MATERIAL WITH LASER BEAM

(75) Inventors: Jun Wang, Abiko; Hiroyuki Niino, Tsukuba; Akira Yabe, Tsuchiura, all of (JP)

(73) Assignee: Director-General of Agency of Industrial Science and Technology (JP)

( * ) Notice: Subject to any disclaimer, the term of this patent is extended or adjusted under 35 U.S.C. 154(b) by 0 days.

(21) Appl. No.: 09/267,683

(22) Filed: Mar. 15, 1999

(30) Foreign Application Priority Data

Sep. 21, 1998 (JP) ............................................ 10-265837

(51) Int. Cl.[7] ........................ B23K 26/12; B29D 11/00
(52) U.S. Cl. ............................ 219/121.69; 219/121.84; 216/24; 216/65
(58) Field of Search ........................... 216/24, 26, 65, 216/94; 219/121.61, 121.68, 121.69, 121.84, 121.85

(56) References Cited

U.S. PATENT DOCUMENTS

| | | | | |
|---|---|---|---|---|
| 4,392,476 A | * | 7/1983 | Gresser et al. ............ | 125/30 R |
| 4,478,677 A | * | 10/1984 | Chen et al. .................. | 156/635 |
| 4,598,039 A | * | 7/1986 | Fischer et al. ................ | 216/24 |
| 4,970,366 A | * | 11/1990 | Imatou et al. ......... | 219/121.68 |
| 5,061,840 A | * | 10/1991 | Portney et al. ............... | 216/26 |
| 5,326,426 A | * | 7/1994 | Tam et al. ..................... | 216/41 |
| 5,354,633 A | * | 10/1994 | Lewis et al. .................. | 430/5 |
| 5,460,284 A | * | 10/1995 | Foltz et al. .................... | 216/65 |
| 5,567,484 A | * | 10/1996 | Baumgart et al. .......... | 427/555 |
| 5,656,186 A | * | 8/1997 | Mourou et al. ........ | 219/121.69 |
| 6,049,058 A | * | 4/2000 | Dulaney et al. ....... | 219/121.84 |

FOREIGN PATENT DOCUMENTS

| | | | | |
|---|---|---|---|---|
| JP | 60-166488 A | * | 8/1985 | ................. 216/94 |
| JP | 62136578 | | 6/1987 | |
| JP | 62-136578 A | * | 6/1987 | |
| JP | 62180088 | | 8/1987 | |
| JP | 62-224688 | * | 10/1987 | ................. 216/94 |
| JP | 9115891 | | 5/1997 | |
| JP | 9-115891 A | * | 5/1997 | |
| JP | 10305374 | | 11/1998 | |

* cited by examiner

Primary Examiner—Randy Gulakowski
Assistant Examiner—Jiri F. Smetana
(74) Attorney, Agent, or Firm—Lorusso & Loud

(57) ABSTRACT

A method of etching a surface of a transparent solid material with a laser beam, wherein the surface is irradiated with the laser beam having a fluence of 0.01–100 J/cm$^2$/pulse while maintaining a fluid capable of absorbing the laser beam in contact with an opposite surface of the solid material.

12 Claims, 2 Drawing Sheets

METHOD OF ETCHING TRANSPARENT SOLID MATERIAL WITH LASER BEAM

This invention relates to a method of etching a transparent solid material with a laser beam.

It is generally known to be difficult to etch a surface of a transparent material such as fused silica by conventional laser ablation in which the surface is simply irradiated with a laser beam. One known method to microfabricate fused silica is optical and electron beam lithography, which is a complicated process including patterning a multilayer mask and transferring the pattern to a silica surface by reactive ion etching. In order to develop simpler processes of fabricating fused silica, vacuum ultraviolet laser processing and ultra-short-pulse laser micromatching have been proposed. Also proposed is a laser-induced plasma method in which a metal substrate and a glass are placed in a vacuum chamber and in which the metal is irradiated with a laser beam to generate a plasma for processing the glass. These methods require complicated apparatuses and need high vacuum conditions.

A thermal drilling method is known in which a $NiSO_4$ solution heated with a long pulse laser beam is used to drill fused silica (Ikeno, J. of Seimitsu Kougaku, vol. 55, p.335 (1989)). In order to thermally drill fused silica, it is necessary to use an infrared laser beam having a pulse width of 1 ms and a fluence of 10,000 $J/cm^2$/pulse.

SUMMARY OF THE INVENTION

It is, therefore, an object of the present invention to provide a method capable of efficiently etching a transparent material with a relatively low energy laser beam.

Another object of the present invention is to provide a simple method of fine processing a transparent material, which does not require vacuum conditions, which is a one-step process and which is suited for mass production.

In accomplishing the foregoing objects, there is provided in accordance with the present invention a method of etching a transparent solid material having opposing first and second surfaces, comprising irradiating said second surface with a pulsed laser beam having a fluence of 0.01–100 $J/cm^2$/pulse while maintaining said first surface in contact with a fluid capable of absorbing the laser beam so that said first surface is etched with the laser beam incident upon said second surface.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
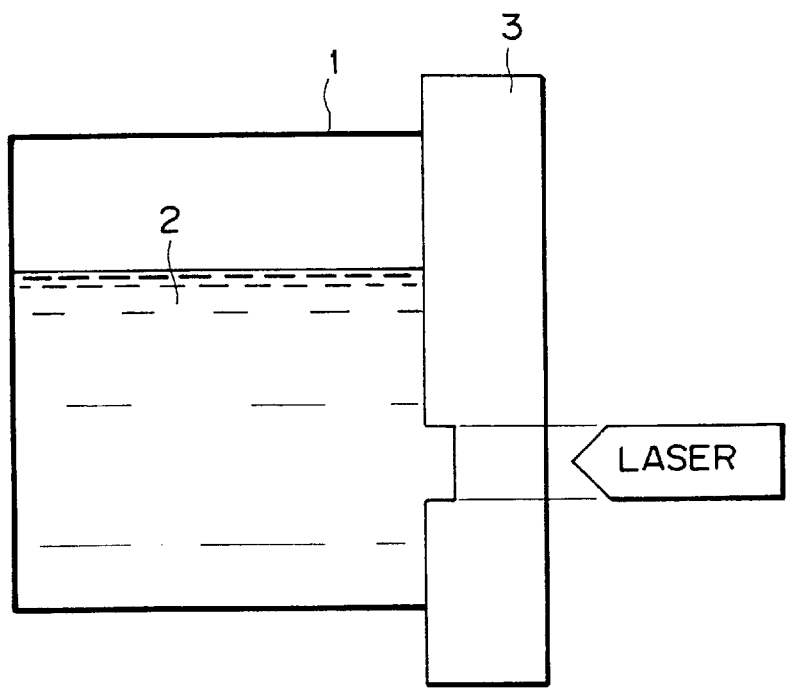
FIG. 1 is a schematic illustration of an apparatus used for carrying out the method according to the present invention.

Referring to FIG. 1 illustrating an apparatus for carrying out the etching method according to the present invention, designated as 1 is a vessel for containing a fluid 2 capable of absorbing a laser beam. A transparent solid material 3 (in the form of a plate in the illustrated case) to be etched is secured to the vessel 1 with a first surface 3a being in contact with the fluid 2. Laser beam is allowed to pass through the transparent solid material 3 from a second surface 3b thereof which is opposite the first surface 3a, so that the irradiated portion on the first surface 3a is etched with the laser beam.

With the above method, only the first surface 3a is selectively etched with the second surface 3b remaining unetched. The etched portions are not chemically damaged or deteriorated. Further, the etched pattern has sharp edges and is free from cracks or distortion. Since the etching rate depends upon the intensity of the laser beam irradiation, it is possible to precisely control the etching step. Additionally, since the etch depth proportionally increases with an increase of the laser fluence, it is easy to control the etch depth.

Though not wishing to be bound by the theory, it is presumed that only the first surface 3a in contact with the laser absorbing fluid 2 is heated and melted upon irradiation with the laser beam. The melted portion of the solid material 3 is removed from the bulk solid material 3 into the fluid 2 which is also locally superheated by photo-ablation.

Any transparent solid material inclusive of inorganic and organic materials may be etched by the method of the present invention as long as the material is transparent to a laser beam used. Illustrative of suitable inorganic transparent materials are fused silica, ordinary glass, calcium fluoride, magnesium fluoride, lithium fluoride, silicon carbide, alumina, sapphire, crystallized quartz and diamond. Illustrative of suitable organic transparent solid material are plastic materials such as polycarbonate resins, acrylic resins and vinyl resins. Organic glasses, organic crystals and organic solid compounds may be also used. The transparent solid material may be in any desired form such as a plate, a cylinder, a rod, film, a vessel or a block.

In etching with a laser beam, the transparent solid material is maintained in contact with a fluid, such as a solution, a dispersion, a gas or a fluidizing powder, capable of absorbing the laser beam.

Examples of laser-absorbing fluids include solvent solutions of organic compounds such as aromatic compounds and organic dyes; liquid organic compounds such as benzene, toluene and carbon tetrachlorides; a dispersion containing organic pigments or inorganic pigments; and fluidized powders of organic compounds and inorganic pigments.

Any suitable organic solvent, such as an alcohol, a ketone, an ester, an ether or a hydrocarbon, may be used for the preparation of solvent solutions of organic compounds. Illustrative of suitable solvent solutions of organic compounds are an acetone solution of pyrene, acetone solution of benzil, a tetrahydrofran solution of pyrene, an ethanol solution of rhodamine 6G and an ethanol solution of phthalocyanine.

It is preferred that the fluid be capable of absorbing at least 10%, more preferably at least 50%, of the laser beam when the laser beam passes through the fluid through a length of 0.1 mm. The absorbance of the fluid can be controlled by adjusting the concentration of the above-described laser-absorbing substances.

Any pulsed laser beam having a fluence of 0.01–100 J/cm$^2$/pulse may be used for the purpose of the present invention. Illustrative of suitable laser are ArF excimer laser ($\lambda$=193 nm), KrCl excimer laser ($\lambda$=222 nm), KrF excimer laser ($\lambda$=248 nm), XeCl excimer laser ($\lambda$=308 nm), XeF excimer laser ($\lambda$=351 nm), dye laser, Kr ion laser, Ar ion laser and copper vapor laser. A harmonic wavelength beam of YAG laser and YLF laser (such as transformed by a non-linear optical element) may be used. In the case of YAG laser, for example, a second harmonic wavelength ($\lambda$=532 nm), a third harmonic wavelength ($\lambda$=355 nm) and fourth harmonic wavelength ($\lambda$=266 nm) may be used. A laser beam having a wavelength in a ultraviolet region and a pulse width of 10–100 ns is preferably used.

The intensity of the laser beam used may vary according to the kind and/or concentration of the laser-absorbing fluid and the kind of the transparent material to be etched but should be in the range of 0.01–100 J/cm$^2$/pulse, preferably 0.1–10 J/cm$^2$/pulse. Too high a fluence above 100 J/cm$^2$/pulse may cause a damage of the transparent material to be etched. When the fluence is below 0.01 J/cm$^2$/pulse, etching may fail to proceed effectively.

The irradiation of the transparent solid material with a laser beam may be carried out in various suitable manners. When the transparent material to be etched is in the form of a vessel, the laser absorbing fluid may be filled in the vessel. In the case of a tubular transparent material, one open end thereof is closed with the laser absorbing fluid being contained therewithin. An exterior surface of the vessel or the tube is then irradiated with the laser. A transparent solid material in the form of a flat or curved plate may be secured by a suitable holder which in turn is fixed to one side of a container for containing the laser absorbing fluid. Thus, as long as the surface of the transparent solid material to be etched can be maintained in contact with the laser absorbing fluid and an opposing surface thereof can be irradiated with the laser beam, a desired etching treatment can be performed in accordance with the present invention. The etching method may be suitably performed at room temperature under an ambient pressure. As necessary, the laser absorbing fluid can be stirred or recirculated during the laser beam irradiation.

As long as a surface to be etched of the transparent solid material, which is contacted with the laser absorbing fluid, is able to be irradiated with a laser beam, the laser irradiation may be performed with any desired incident angle. If desired, two or more laser beams may be used in combination, either concurrently or sequentially. A lens, a filter, a mask or any other conventional laser optics may be disposed between a laser source and the transparent solid material to be processed. In particular, by disposing a mask pattern in the path of the laser beam, it is possible to form a fine, well defined etching pattern having a line width of below 10 $\mu$m.

With the method according to the present invention, a transparent solid material can be processed to form fine structure of a $\mu$m order. Thus, the present invention can be advantageously utilized for various applications such as the fabrication of gratings, micro-lenses and masks and the formation of markings.

The following examples will further illustrate the present invention.

EXAMPLE 1

A transparent fused silica plate (Superasil II, product of Heraeus) with a thickness of about 0.5 mm was used as the sample to be processed. A KrF laser ($\lambda$=248 nm) was used as the light source. The intensity of the laser beam was attenuated by a dielectric mirror positioned in front of the laser output. One side of the sample plate was maintained in contact with an acetone solution containing 0.4 mol/dm$^3$ of pyrene (as a laser absorbing fluid) and the other side was irradiated with the laser at room temperature and ambient pressure, as shown in FIG. 1. Etching was carried out with 400 pulses of irradiation with a repetition rate of 2 Hz and a fluence of 0.9 J/cm$^2$/pulse. A metal stencil mask was used to etch a pattern of 10 $\mu$m lines and spaces. Scanning electron microscopy revealed that the etched pattern had lines of 10 $\mu$m wide and 3.5 $\mu$m deep with well-defined sharp edges. Neither debris nor cracks were found on the surface around the etched area, unlike in conventional laser ablation and ultra-short pulse laser ablation. The etched surface was also smooth and debris-free.

Figure 2:
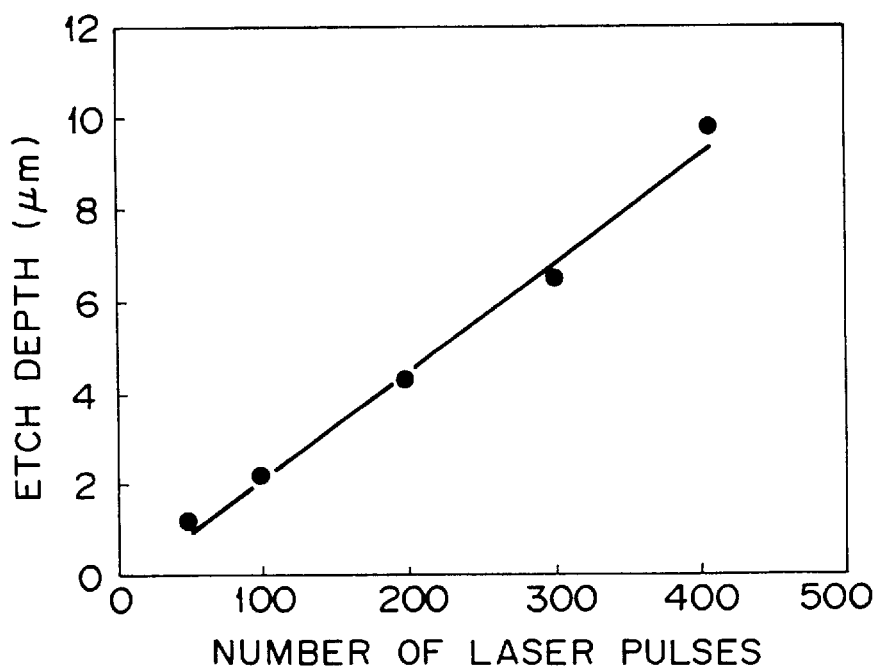
FIG. 2 is a plot of the etch depth as a function of the number of laser pulses in the irradiation with a KrF laser at a fluence of 1.1 $J/cm^2$/pulse using an acetone solution containing pyrene at a concentration of 0.4 $mol/dm^3$.

A relationship between the etch depth and the number of laser pulses was investigated. Thus, the above etching procedure was repeated in the same manner except that etching was carried out up to 400 pulses of irradiation with a repetition rate of 2 Hz and a fluence of 1.1 J/cm$^2$/pulse. The results were as shown in FIG. 2. A linear relationship was confirmed up to an etch depth of 10 $\mu$m, indicating that the etch depth is able to be controlled by the number of pulses.

Figure 3:
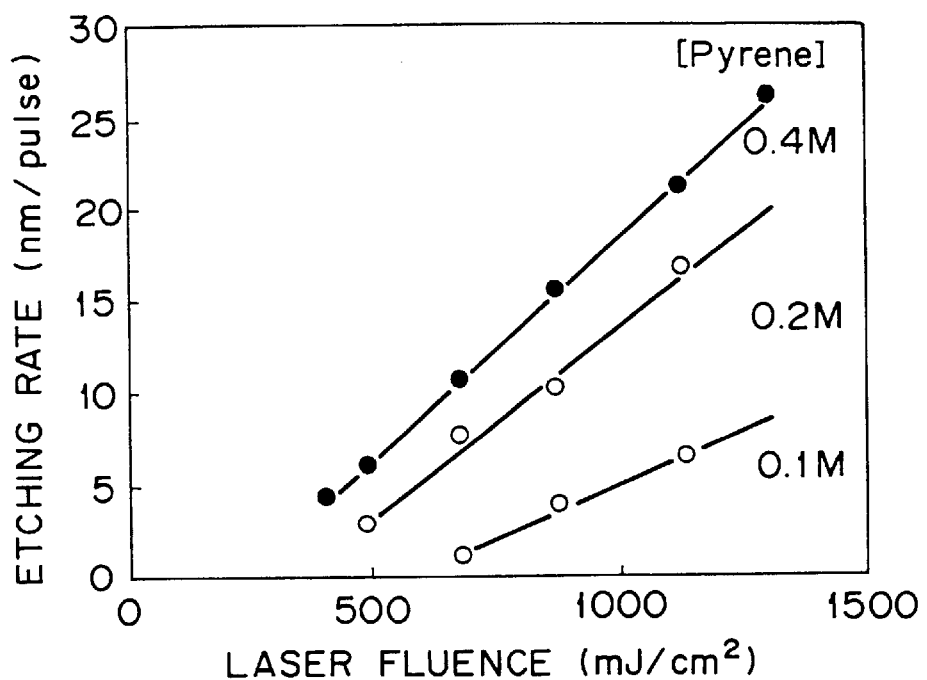
FIG. 3 is a plot of the etching rate as a function of laser fluence in the irradiation with a KrF laser using an acetone solution containing pyrene at concentrations of 0.1 $mol/dm^3$ (white box), 0.2 $mol/dm^3$ (white circle) and 0.4 $mol/dm^3$ (solid circle)

A relationship between the etching rate and the laser fluence at different concentrations of the pyrene solutions was also investigated. Thus, using three kinds of acetone solutions of pyrene having pyrene concentrations of 0.1, 0.2 and 0.4 mol/dm$^3$, etching was carried out in the same manner as above except that the laser fluence was varied in the range of 0.3–1.5 J/cm$^2$/pulse. The results were as shown in FIG. 3. A linear relationship was confirmed, indicating that the etching rate is able to be controlled by the laser intensity.

Figure 4:
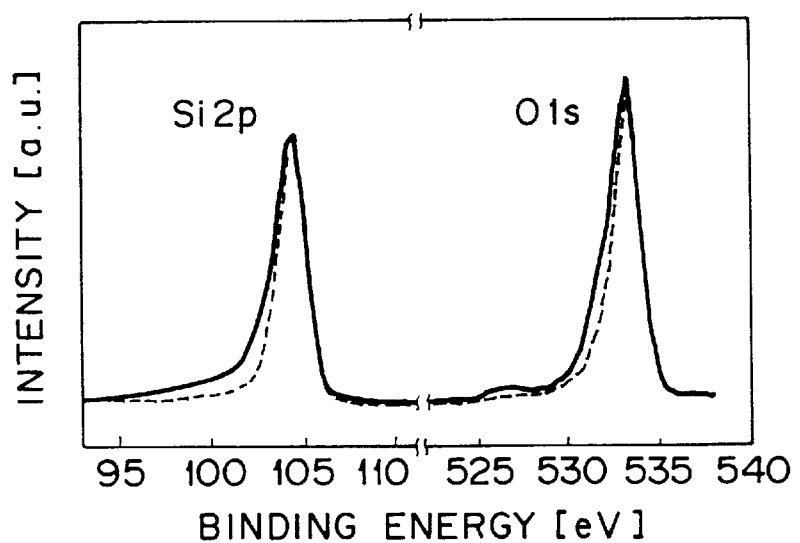
FIG. 4 shows X-ray photoelectron spectra (XPS) of Si-2p and O-1s of the fused silica surface irradiated with 100 pulses of KrF laser at 940 $mJ/cm^2$ (solid line) and those of the bulk fused silica (dashed line).

An etched sample obtained by etching the sample by irradiation of KrF laser ($\lambda$=248 nm) of 100 pulses with a repetition rate of 2 Hz and a fluence of 0.9 J/cm$^2$/pulse was washed with ethanol and analyzed by X-ray photoelectron spectroscopy (XPS) of Si-2p and O-1s. The results are shown by the solid line in FIG. 4. Shown by the dashed line in FIG. 4 are the spectra of the sample which has not been irradiated. The results indicate that the etched surface is similar to that of the bulk silica. Namely, no change occurs in the chemical composition of the sample before and after the etching.

EXAMPLE 2

A transparent fused silica plate sample as used in Example 1 was processed in the same manner as in Example 1 using a tetrahydrofuran solution containing 1.0 mol/dm$^3$ of pyrene as a laser absorbing fluid. An etching rate of 5.5 nm/pulse was obtained with a fluence of 0.4 J/cm$^2$/pulse.

EXAMPLE 3

A transparent fused silica plate sample as used in Example 1 was processed in the same manner as in Example 1 using an acetone solution containing 0.8 mol/dm$^3$ of benzil as a laser absorbing fluid. An etching rate of 4 nm/pulse was obtained with a fluence of 0.6 J/cm$^2$/pulse.

EXAMPLE 4

A transparent fused silica plate sample as used in Example 1 was processed in the same manner as in Example 1 using an ethanol solution containing 0.1 mol/dm$^3$ of rhodamine 6G as a laser absorbing fluid. An etching rate of 10 nm/pulse was obtained with a fluence of 2 J/cm²/pulse.

EXAMPLE 5

A transparent fused silica plate sample as used in Example 1 was processed in the same manner as in Example 1 using an acetone solution containing 1.0 mol/dm³ of pyrene as a laser absorbing fluid and XeCl laser (λ=308 nm). Etching was able to be effectively performed.

EXAMPLE 6

A transparent fused silica plate sample as used in Example 1 was processed in the same manner as in Example 1 using an acetone solution containing 1.0 mol/dm³ of pyrene as a laser absorbing fluid and forth harmonic wavelength of YAG laser (λ=266 nm). Etching was able to be effectively performed.

EXAMPLE 7

A transparent fused silica plate sample as used in Example 1 was processed in the same manner as in Example 1 using an ethanol solution containing 0.1 mol/dm³ of rhodamine 6G as a laser absorbing fluid and a second harmonic wavelength of YAG laser (λ=532 nm). Etching was able to be effectively performed.

EXAMPLE 8

A transparent fused silica plate sample as used in Example 1 was processed in the same manner as in Example 1 using an aqueous dispersion containing carbon black and a surfactant as a laser absorbing fluid and a second harmonic wavelength of YAG laser (λ=532 nm). Etching was able to be effectively performed.

EXAMPLE 9

A transparent soda glass was processed in the same manner as in Example 1 using an ethanol solution containing 0.1 mol/dm³ of rhodamine 6G as a laser absorbing fluid and a second harmonic wavelength of YAG laser (λ=532 nm). Etching was able to be effectively performed.

EXAMPLE 10

A transparent soda glass was processed in the same manner as in Example 1 using an aqueous dispersion containing carbon black and a surfactant as a laser absorbing fluid and a second harmonic wavelength of YAG laser (λ=532 nm). Etching was able to be effectively performed.

EXAMPLE 11

A transparent polyacrylate resin film was processed in the same manner as in Example 1 using an ethanol solution containing 0.1 mol/dm³ of rhodamine 6G as a laser absorbing fluid and a second harmonic wavelength of YAG laser (λ=532 nm). Etching was able to be effectively performed.

COMPARATIVE EXAMPLE 1

A transparent fused silica plate sample as used in Example 1 was processed in the same manner as in Example 1 except that no laser absorbing fluid was used. Thus, the sample was directly irradiated with KrF laser (λ=248 nm) in air. No etching was observed with a fluence of up to 10 J/cm²/pulse. When the sample was irradiated with KrF laser with a fluence of greater than 10 J/cm²/pulse, the irradiated surface was damaged.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H10-265837, filed Sep. 21, 1998, inclusive of the specification, claims and drawings, are hereby incorporated by reference herein.

What is claimed is:

1. A method of etching a transparent solid material having opposing first and second surfaces, comprising irradiating said second surface with a pulsed laser beam having a fluence of 0.01–100 J/cm²/pulse while maintaining said first surface in contact with a fluid capable of absorbing the laser beam so that said first surface is etched with the laser beam incident upon said second surface, wherein said fluid is a liquid solution of a substance selected from the group consisting of pyrene, benzil, and rhodamine 6G.

2. A method as claimed in claim 1, wherein said fluid is capable of absorbing at least 10% of the laser beam when the laser beam passes through a length of 0.1 mm of said fluid.

3. A method as claimed in claim 1, wherein said transparent solid material is selected from the group consisting of fused silica, glass, sapphire, calcium fluoride, silicon carbide, alumina, quartz and diamond.

4. A method as claimed in claim 1 further comprising passing the laser beam through a mask pattern in the path of the laser beam to form an etching pattern having a line width of less than 10 μm.

5. A method as claimed in claim 2 further comprising passing the laser beam through a mask pattern in the path of the laser beam to form an etching pattern having a line width of less than 10 μm.

6. A method as claimed in claim 3 further comprising passing the laser beam through a mask pattern in the path of the laser beam to form an etching pattern having a line width of less than 10 μm.

7. A method as claimed in claim 1 wherein the laser is at ambient pressure.

8. A method as claimed in claim 4 wherein the laser is at ambient pressure.

9. A method as claimed in claim 1 wherein said fluid is locally superheated by photo-ablation.

10. A method as claimed in claim 4 wherein said fluid is locally superheated by photo-ablation.

11. A method as claimed in claim 7 wherein said fluid is locally superheated by photo-ablation.

12. A method as claimed in claim 8 wherein said fluid is locally superheated by photo-ablation.

* * * * *